2,995,982
REAR VIEW MIRROR

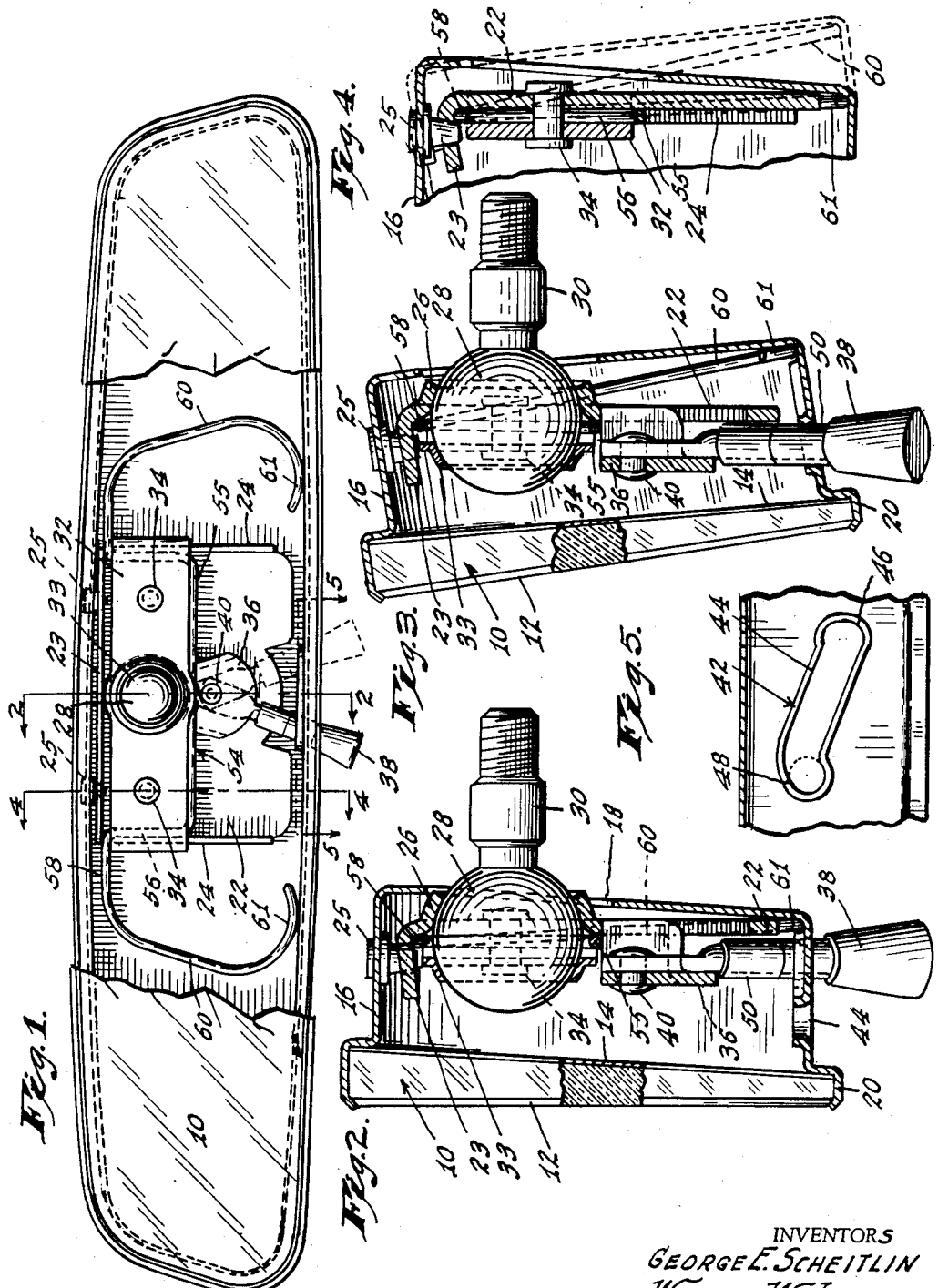

George E. Scheitlin and William W. Julbert, Columbus, Ind., assignors to Arvin Industries, Inc., Columbus, Ind., a corporation of Indiana
Filed May 21, 1958, Ser. No. 736,854
4 Claims. (Cl. 88—77)

This invention relates to a rear view mirror adapted for use in automobiles, and more particularly to a rear view mirror which includes a transparent low efficiency reflector disposed in front of, and at an angle to, a high efficiency reflector, such that tilting of the mirror produces either a dimly or a brightly reflected image.

It is an object of our invention to provide a rear view mirror of the type referred to above which will be of attractive appearance, which can be easily adjusted to produce the desired amount of reflectance without displacing the entire mirror to remove the reflected image from the view of an observer, and which will be releasably locked in each of its positions of adjustment.

In carrying out our invention in the preferred form, there is provided a mirror carried in a mirror housing. The mirror is a double mirror having a low efficiency reflector disposed in front of, and at an angle to, a high efficiency reflector for reflecting either a dim or a bright image back to an observer.

The housing is pivotally mounted on a tilt-plate which desirably is mounted on the mounting stud whereby said tilt-plate can be pivoted on said mounting stud to dispose said mirror in a position to reflect an image back to an observer. An adjusting arm pivotally interconnected to the tilt-plate extends downwardly from said plate through a cam slot in the bottom wall of the housing so that upon movement of the adjusting arm the housing will be tilted on the tilt-plate to position the image from the desired reflector in view of the observer. Conveniently, biasing means are interconnected between the tilt-plate and the housing to bear against said housing urging it into a normal position of maximum reflectance of the mirror.

The accompanying drawing illustrates our invention. In such drawing:

FIG. 1 is a front elevation of a rear view mirror embodying our invention with portions thereof being broken away to show the tilting mechanism;

FIG. 2 is a vertical section taken on the line 2—2 of FIG. 1;

FIG. 3 is a vertical section similar to FIG. 2 but showing the mirror in a different position of adjustment;

FIG. 4 is a vertical section taken on the line 4—4 of FIG. 1; and

FIG. 5 is a fragmental plan view of the housing camming slot.

In the rear view mirror illustrated in the drawing, there is provided a mirror 10 having a generally rectangular shape and comprising a low efficiency reflector 12 disposed in front of, and at a slight angle to, a high efficiency reflector 14. Each of these reflectors produces a separate image of different reflected intensity, but with the mirror being positioned at a relatively great distance from the observer the image from only one of the reflectors will be perceptible at a time. The mirror is carried in a housing 16 conveniently formed from a dished sheet-metal stamping provided with an aperture 18 in its back wall and a peripheral flange 20 extending around its front edge and press-fit over the edges of the mirror 10 to rigidly retain said mirror in the open front face of said housing.

Disposed within the housing 16 adjacent its back wall is a tilt-plate 22 having a forwardly extending flange 23 along its upper edge and a forwardly extending flange 24 at each of its lateral edges. The upper wall of the housing 16 may be tiltably mounted on the flange 23 of the plate 22 in any convenient manner. As shown in FIG. 2, we prefer to interconnect the upper wall of the housing 16 to the tilt-plate flange 23 with pins 25 which permit the housing 16 to be tilted with respect to the plate 22 about the axis of a line interconnecting the pins 25.

A rearwardly extending shouldered aperture 26 is formed in the plate 22 and is adapted to be received on the ball 28 of a mounting stud 30. The tilt-plate 22 is retained on the ball 28 by a bracket 32 provided with a shouldered aperture 33 received on the forwardly presented face of the ball 28. The bracket 32, which is conveniently formed of spring steel, is fixedly retained on the tilt-plate 22 by means of rivets 34 with the end portions of said bracket abutting the plate flanges 24 and the shouldered aperture 33 biased against the ball 28. Thus, the apertures 26 and 33 on the tilt-plate and bracket form a ball and socket joint with ball 28 so that the mirror can be pivoted in said ball into the desired position of adjustment for reflecting an image back to an observer, with biasing action of the bracket 32 retaining the mirror in the desired position of adjustment.

As shown in FIGS. 2 and 3, the mirror 10 is adjustable to reflect the image from the selected one of the two reflectors 12 or 14 back to the observer by tilting the housing, and thus the mirror, about the axis of the pivotal connection between the plate 22 and the housing 16. To produce such a tilting action, the tilt-plate 22 is offset, as at 36. An adjusting arm 38 is pivotally mounted on the offset 36, as by rivet 40 and extends downwardly beyond through a camming slot 42 cut in said lower housing face. As shown in FIG. 5, the camming slot 42 comprises an obliquely extending stretch 44 interconnecting forward and rearward locking stretches 46 and 48 respectively. Desirably, the locking stretches 46 and 48 are disposed at an angle to the stretch 44 and releasably lock the mirror in the desired position of adjustment. As shown in FIG. 2, when the lower end of the arm 38 is moved into the rearwardly disposed locking stretch 48 (to the left as shown in FIG. 1), the lower end of the housing 16 is carried forwardly (toward the driver) by the slot 42 to tilt the mirror into a position in which the low efficiency reflector is in operative position to reflect a dim image back to an observer. Conversely, as shown in FIG. 3, reverse sliding movement of the arm 38 will carry said arm into the forwardly disposed locking stretch 46 of the slot 42 to tilt the lower end of the housing 16 into a generally rearward position in which the high efficiency reflector will be disposed in an operative position to reflect a bright image back to the observer. Conveniently, in order to prevent a metal to metal contact between the arm 38 and the edges of the camming slot 42, a bearing sleeve 50 formed from any desired material such as nylon or the like may be disposed on the adjusting arm.

In order to facilitate rearward tilting of the lower portion of the housing 16 to move the mirror into a position of maximum reflectance as shown in FIG. 3, there is provided a generally U-shaped torsion spring. The spring comprises an intermediate stretch 54 having a downwardly extending generally U-shaped central portion including a bight 55 interconnecting a pair of vertically extending legs 56. Said central portion of the intermediate stretch 54 is bindingly retained between the bracket 32 and the front face of the tilt-plate 22 with the legs 56 extending upwardly along the inner faces of the tilt-plate flanges 24 to the flange 23 where they are integrally connected to the lateral ends 58 of the intermediate stretch, said lateral ends abutting the lower face of the flange 23 and extending laterally outward from the tilt-plate through openings between the flanges 23 and 24. Extending downwardly from the lateral ends 58 of the intermediate stretch are vertical stretches 60 whose lower ends curve inwardly, as at 61, and bear against the lower housing wall at its connection to the back wall of the housing. The inwardly curved ends 61 of the stretches 60 bear against the lower housing wall to hold said ends in a fixed position thereon and urge the housing 16 in a generally downward direction to hold the pins in the openings in the tilt-plate flange 23, and thereby retain the housing on said tilt-plate.

The vertical stretches 60 of the spring are angled rearwardly out of the general plane of the intermediate stretch 54 and its central portion 55 and 56 so that when the spring is disposed within the housing the vertical stretches 60 are forced forwardly by the back wall of the housing. This produces a counter or torsion force in the lateral ends 58 of the intermediate stretch causing the vertical stretches 60 to bear against the lower portion of the back wall of the housing urging it rearwardly to position the high efficiency reflector 14 into operative position.

Tilting of the mirror to move it from the position of bright reflectance shown in FIG. 3 to the position of dim reflectance shown in FIG. 2 may be described as follows: The arm 38 is pivoted about the axis of the rivet 40 to move it out of the locking stretch 46 and into the rearward locking stretch 48. During this pivotal movement the obliquely extending stretch 44 cams the lower portion of the housing 16 forwardly, tilting the housing about the axis of its pivotal connection to the tilt-plate 22. This tilting movement of the housing 16 moves the vertical stretches 60 of the spring forward with respect to the intermediate stretch 54 to produce an additional torsional force in the lateral ends 58 of the intermediate stretch. Upon movement of the adjusting arm 38 from the locking notch 48 to the locking notch 46 the mirror will be tilted into its position of maximum reflectance shown in FIG. 3 with the torsion in the spring supplementing the tilting action of the arm 38 to give a snap-action tilting movement. The mirror is releasably held in the position of maximum reflectance by biasing action of the torsion spring and by the reception of the adjusting arm 38 in the locking stretch 46.

We claim as our invention:

1. In a rear view mirror, a housing having its front side open, a mirror fixedly secured within said housing and having a low and a high efficiency reflector angularly disposed in a front to back relationship, a tilt-plate disposed within said housing and pivotally joined thereto along the upper wall of said housing, said tilt-plate having a forwardly projecting offset formed thereon, an adjusting arm pivotally supported on to said tilt-plate offset and extending through an obliquely extending camming slot in the lower housing wall whereby pivotal movement of said arm causes said arm to bear against the edges of said slot to tilt the housing about the tilt-plate to dispose one of said reflectors in position to reflect an image back to an observer, said adjusting arm having a bearing sleeve mounted thereon for engagement with the edges of said slot, a torsion spring having an intermediate stretch operatively connected to said tilt-plate and continuous with a pair of outwardly projecting end stretches angled out of the plane of said intermediate stretch and bearing against the lower and back housing walls to urge said housing into one of its tilted positions of adjustment and prevent said housing from stopping in an intermediate position of tilt in which neither of said reflectors is disposed in operative position, and means on said tilt-plate for pivotally mounting it on a mounting member.

2. In a rear view mirror, a housing having its front side open, a mirror fixedly secured within said housing and having a low and a high efficiency reflector angularly disposed in a front to back relationship, a tilt-plate disposed within said housing and pivotally joined thereto along the upper wall of said housing, a bracket mounted on the front face of said tilt-plate, said bracket and tilt-plate having aligned shouldered openings for reception on a mounting stud extending through the housing for mounting said housing thereon, an adjusting arm pivotally supported on said tilt-plate and extending through an obliquely extending camming slot in the lower housing wall whereby pivotal movement of said arm about the axis of its connection to said tilt-plate causes said arm to bear against the edges of said slot to tilt the housing about the tilt-plate to dispose one of said reflectors in position to reflect an image back to an observer, and a torsion spring having a generally U-shaped intermediate stretch fixedly retained between said bracket and tilt-plate with the ends of said intermediate stretch being connected to and continuous with the upper ends of a pair of generally vertical spring stretches angled out of the plane of said intermediate stretch and biasing against the lower and back housing walls to retain said tilt-plate and housing pivotally connected and to urge said housing into a position to dispose the mirror in a position of maximum reflectance, and prevent said housing from stopping in an intermediate position of tilt in which neither of said reflectors is disposed in operative position.

3. In a rear view mirror, a housing having its front side open, a mirror fixedly secured within said housing and having a low and a high efficiency reflector angularly disposed in a front to back relationship, a tilt-plate disposed within said housing and pivotally joined thereto along the upper wall of said housing, an adjusting arm pivotally supported on said tilt-plate and extending through a camming slot in the lower housing wall, said slot including a pair of locking stretches generally parallel to the plane of the mirror and interconnected by an obliquely extending camming stretch whereby pivotal movement of said arm about the axis of its connection to said tilt-plate from one of said locking stretches to the other causes said arm to bear against the edges of said camming stretch to tilt the housing about the tilt-plate to dispose one of said reflectors in position to reflect an image back to an observer, a torsion spring having an intermediate stretch operatively connected to said tilt-plate and continuous with a pair of outwardly projecting generally vertical end stretches angled out of the plane of said intermediate stretch and bearing against the lower and back housing walls to urge said housing into one of its tilted positions of adjustment and prevent said housing from stopping in an intermediate position of tilt in which neither of said reflectors is disposed in operative position, and means on said tilt-plate for pivotally mounting it on a mounting member.

4. In a rear view mirror, a housing having a mirror provided with a low and high efficiency reflector fixedly mounted in its open front face, a tilt-plate pivotally joined to the upper housing wall between said mirror and the back housing wall, a laterally swingable adjusting arm mounted on said tilt-plate and extending through an obliquely extending camming slot in the lower housing wall whereby lateral swinging of said arm about the axis of its connection to said tilt-plate causes said arm to bear against the edges of said slot to tilt the housing on the tilt-plate to dispose one of said reflectors in operative position, a torsion spring having a generally U-shaped first portion operatively connected to said tilt-plate and continuous with a second portion constituting a pair of spring stretches projecting outwardly and downwardly from said first portion and angled out of the plane thereof, said pair of spring stretches bearing against the juncture of the lower and back walls of said housing, said spring exerting downwardly directed biasing action against said housing for retaining said tilt-plate and housing pivotally connected and a torsional force against the back wall of said housing to urge said housing into a normally tilted position of maximum reflectance in which the high efficiency reflector is disposed in operative position whereby said housing is prevented from stopping in an intermediate position of adjustment in which neither of said reflectors is disposed in operative position, and means on said tilt-plate for pivotally mounting it on a mounting member.

References Cited in the file of this patent

UNITED STATES PATENTS

| | | |
|---|---|---|
| 2,052,770 | Hofer | Sept. 1, 1936 |
| 2,722,159 | Budreck | Nov. 1, 1955 |
| 2,839,964 | Ponce | June 24, 1958 |
| 2,843,017 | Ponce | July 15, 1958 |

FOREIGN PATENTS

| | | |
|---|---|---|
| 1,117,799 | France | Mar. 5, 1956 |